July 17, 1962  R. O. BUSHNELL  3,044,158
SAFETY SOCKET METER GRIPPER
Filed Aug. 16, 1957  2 Sheets-Sheet 1

*Raymond O. Bushnell.*
INVENTOR.

BY *John G. Burns*
AGENT

July 17, 1962  R. O. BUSHNELL  3,044,158
SAFETY SOCKET METER GRIPPER
Filed Aug. 16, 1957  2 Sheets-Sheet 2

Raymond O. Bushnell.
INVENTOR.

BY John G. Burns
AGENT

United States Patent Office 3,044,158
Patented July 17, 1962

3,044,158
SAFETY SOCKET METER GRIPPER
Raymond O. Bushnell, 2543 SW. 12th St., Miami, Fla.
Filed Aug. 16, 1957, Ser. No. 678,501
5 Claims. (Cl. 29—278)

My invention relates to the removal and the installation of electric meters.

It is an object of my invention to provide a simple, convenient and practical unit by which a meter may be mounted or removed.

It is a further object of my invention to provide a safety device which gives protection to an individual while placing or removing a meter in a meter socket.

A further object is to provide a safety meter gripper which is particularly useful in removing and installing meters of the socket type, especially heavy duty and demand types.

Figure 1:
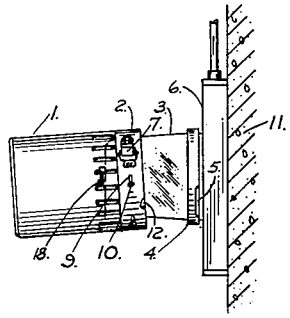
Figure 2:
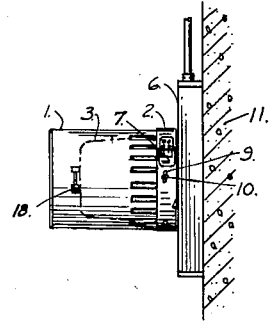
Figure 3:
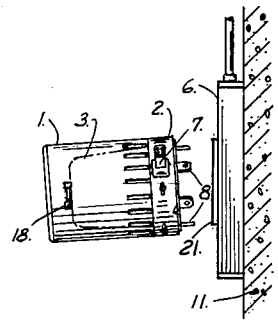
Figure 4:
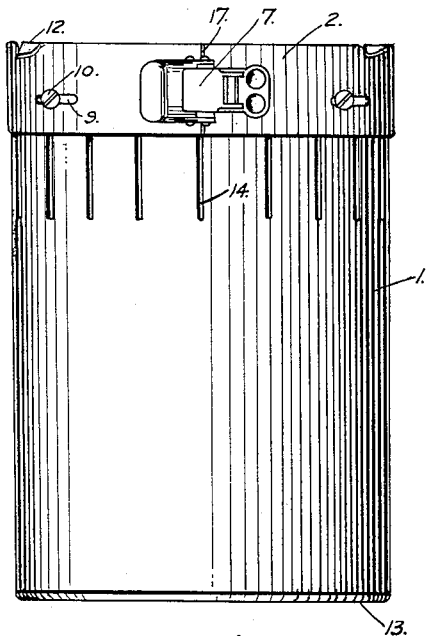
Figure 5:
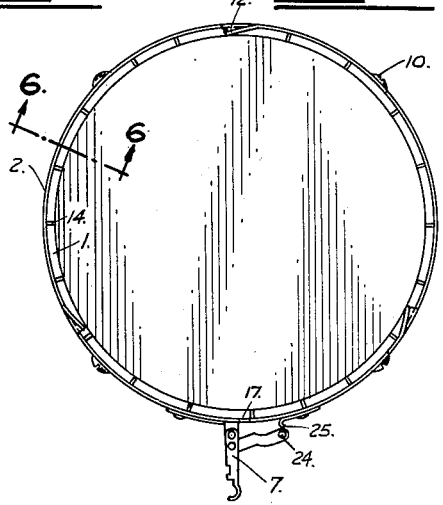
Figure 6:
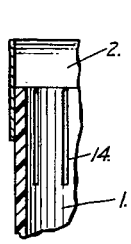
Figure 7:
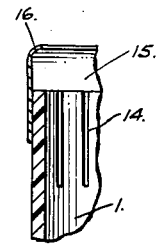
Figure 8:
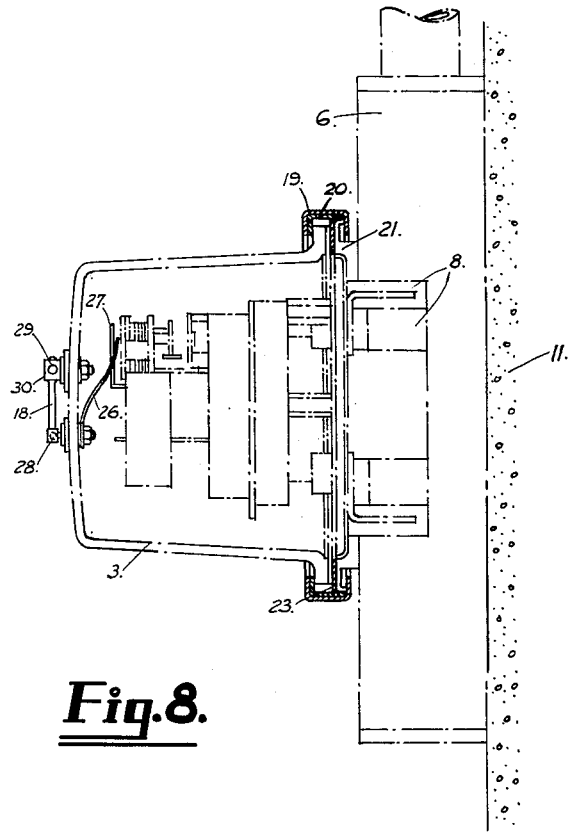
Figure 9:
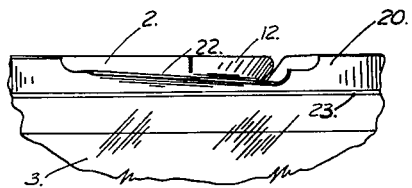
Figure 10:
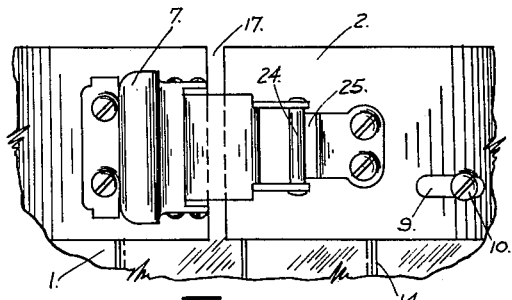

The invention will be readily understood from the following detailed description of specific embodiment when considered in connection with the accompanying drawing. In the drawing, FIG. 1 shows the meter gripper being placed over an installed meter; FIG. 2 shows the meter gripper in position over the meter; FIG. 3 shows the removal of the meter; FIG. 4 is a side view of the meter gripper; FIG. 5 is a top view of the embodiment shown in FIG. 4; FIG. 6 is a cross section view taken on line 6—6 of FIG. 5; FIG. 7 is a cross sectional view similar to FIG. 6 showing a modified form of gripper; FIG. 8 is a sectional view taken along the axis of a normally assembled meter; FIG. 9 is a detail of a portion of the glass cover and cover rim; and FIG. 10 is a view of the meter gripper and latch mechanism.

Like parts are designated by like characters throughout the specification and drawings.

Referring now in detail to the drawing, the safety socket meter gripper consists of an inserter or jacket comprising a shatter-proof glass or plastic cylindrical member 1 having a metal band gripper 2 around one outside end. 3 is a canopy comprising a cup-shaped glass cover of a conventional meter which has a base 4 upon which an indent portion 5 is provided. The housing 6 is a conventional socket meter cabinet which the meter is normally secured to. 7 shows a latching mechanism on the meter gripper band. 8 shows the electrical terminals of the meter base. A slot 9 is formed in the band 2 through which bolt 10 secures the band 2 to member 1. 11 is a wall to which the meter cabinet 6 is secured. 12 is a detent on the edge of the band 2. The cylindrical member 1 is sealed at the end opposite the band 2 with a plastic member 13. 1 and 13 may be a unitary structure. Slots 14 are provided around the open end of the member 1. 15 is a metal band having an edge portion 16 which is curved inwardly toward the center of the member 1 to which the band is fastened by a screw or rivet 10 through slot 9. 17 shows the space or gap between the ends of bands 2 and 15. 18 represents a conventional demand indicator on the face of a demand watthour meter. 19 is a metal clamping ring which secures the meter canopy 3 to the flange 21 of outlet box 6. 20 is a metal band secured to the base of meter canopy 3. 22 shows the slope of the detent which appears on the outer surface of band 20. The member 23 is a gasket of fiber material secured to the base of member 3. 24 is a metal shaft which is engaged by metal hook 25 and is part of the latching mechanism 7. The indicator 26 is part of the demand indicator 18 and is moved to a position of maximum demand by pointer 27 of a conventional watthour meter. 28 is a pivot for the indicator 18 which is pulled out of member 30 and enables the indicator 26 to be reset. 29 is a hole through which a seal can be inserted after the indicator is adjusted.

The meter gripper is a safety tool for installing or removing electric socket type metering units. The gripper is preferably a stainless steel band having three or more indented gripper fingers 12 at the gripping edge. These gripper fingers 12 fit into a recessed portion 5 on the periphery of the band 20 around the base of the meter case. FIGURE 9 shows the inside of the glass canopy 3 having metal band 20 and member 23 secured thereto. The ring 19 is severed forming two ends which are secured together with a fastener which is not illustrated. The ring 19 is removed from the meter 3 and flange 21 by loosening the fastener and thus the gripper can be inserted over the meter case as shown in FIGURE 9. When the plastic inserter is secured to the base 20 of the meter case it may be released by unlatching the fastener 7 and turning the inserter 1 so that the gripper fingers 12 ride ot the top of the edge 20 along slope 22 thus leaving the recessed portion 5 so that the inserter may be removed after the meter is in place. In the event that the band 2 is tight on band 20 the band 2 can be loosened by having the shaft 24 engage the inward side of hook 25 of the latching mechanism and by applying pressure on the fastener 7. The ends of band 2 are readily separated enlarging the gap 17 and permitting the gripper 1 to be removed from the edge 20 of the meter case.

An alternative form of the gripper is shown in FIGURE 7 where the gripper 15 is a stainless steel band having a rolled edge 16 and a free edge that fits over the open end of the plastic inserter 1.

A number of slots 9 are provided in the gripper through which a rivet or screw 10 fastens the gripper 2 to the inserter 1 permitting limited movement between these members. Slots 14 are provided in the gripper to form a vent and also give a gripping action when the gripper is tightened by a fastener.

To remove a meter one merely takes the band 19 off the meter housing and inserts the meter gripper over the meter canopy until the gripper fingers engage the slots in the edge of the meter base or the rolled edge is in place. Then the gripper is tightened by actuating the fastener 7 which closes the gap 17 and secures the gripper to the meter base 20. The whole unit is then removed by pulling on the gripper. The electrical contacts or terminals 8 in the base of the meter fit into jaws located in the meter can and this holds the meter in place until disengaged by removal of the meter.

Likewise, the meter may be inserted by having the gripper over the meter and placing the meter in position by locating the electrical contacts 8 over their respective jaws and exerting force on the gripper. It will be noted that considerable force may be exerted safely against the end 13 of the gripper even though a demand indicator 18 is located on the end of the meter housing. When the meter is in place the latching mechanism 7 is released and the gripper rotated to release the gripper fingers from the slot and then the gripper is pulled off the meter housing. The band 19 can then be installed and the meter is ready for use.

It can readily be seen that the use of the plastic meter gripper provides safety to personnel by avoiding possible injury in the event of a stressed or weakened glass canopy breaking in the bands or in the event of a strain on the terminals causing a short circuit with the resultant molten glass or metal injuring the operator. In addition the meter inserter provides ease of installing or removing meters especially polyphase with indicating demand attachments used on heavy duty devices.

In accordance with the provisions of the patent statutes, I have described the principle of operation of my invention together with the apparatus which I now consider to represent the best embodiment thereof but I desire

What I claim as new and desire to secure by Letters Patent of the United States is:

1. A meter gripper comprising an elongated tubular member adapted to fit over a meter casing, open at one end, and closed at the opposite end and having a plurality of longitudinally extending slots extending from such open end, a band concentric with the open end of said member and rotatably mounted on said member to provide rotation between the member and band, said band having a portion extending beyond the open end of the member, a fastener unit having two parts, one part attached to the outer surface of the band at one end thereof and a second part attached to the outer surface of the band at the opposite end thereof and a gripping device on said portion of the band adapted to grip a circular flanged member on a meter casing.

2. A meter gripper comprising an elongated tubular member adapted to fit over a meter casing, open at one end and closed at the opposite end, and having a plurality of longitudinally extending slots extending from such open end, a band concentric with the open end of said member and rotatably mounted on said member to provide rotation between the member and band, said band having a portion extending beyond the open end of the member, a fastener unit having two parts, one part attached to the outer surface of the band at one end thereof and a second part attached to the outer surface of the band at the opposite end thereof, and a gripping device on said potrion of the band adapted to grip a circular flanged member on a meter casing, said device consisting of a slotted portion in the edge of the band, said band being straight on one adjacent side of the slot and bent inwardly on the other adjacent side.

3. A meter gripper comprising an elongated tubular member adapted to fit over a meter casing, open at one end and closed at the opposite end and having a plurality of longitudinally extending slots extending from such open end, a band concentric with the open end of said member and rotatably mounted on said member to provide rotation between the member and the band, said band having a portion extending beyond the open end of the member, a fastener unit having two parts, one part attached to the outer surface of the band at one end thereof and a second part attached to the outer surface of the band at the opposite end thereof, and a gripping device on said portion of the band adapted to grip a circular flanged member on a meter casing, said device consisting of an inwardly curved portion on the periphery of the band.

4. A meter gripper comprising a transparent cylindrical member adapted to fit over a meter casing, open at one end and closed at the opposite end and having many longitudinally extending slots extending from such open end, a plurality of holes spaced around the outside edge of the member near the open end, a flexible band having a plurality of slots parallel with the edges of the band, mounting means positioned in each slot and hole to provide rotation between the member and band, said band having a portion extending beyond the open end of the member, a fastener unit having two parts, one part attached to the outer surface of the band at one end thereof and a second part attached to the outer surface of the band at the opposite end thereof, and a gripping device on said portion of the band adapted to grip a circular flanged member on a meter casing.

5. A meter gripper comprising a cylindrical member adapted to fit over a meter casing open at one end and closed at the opposite end and having many longitudinally extending slots extending from such open end, a plurality of holes spaced around the outside edge of the body near the open end, a flexible band having a plurality of slots parallel with the edges of the band, mounting means positioned in each slot and hole to provide rotation between the member and band, said band having a portion extending beyond the open end of the member, a fastener unit having two parts, one part attached to the outer surface of the band at one end thereof and a second part attached to the outer surface of the band at the opposite end thereof, and a gripping device on said portion of the band adapted to grip a circular flanged member on a meter casing.

References Cited in the file of this patent

UNITED STATES PATENTS

| | | |
|---|---|---|
| 318,103 | Gosling | May 19, 1885 |
| 2,091,050 | McKechnie et al. | Aug. 24, 1937 |
| 2,286,313 | Seaholm | June 16, 1942 |
| 2,294,542 | Chulick et al. | Sept. 1, 1942 |
| 2,320,043 | Merkle | May 25, 1943 |
| 2,380,136 | Whitney | July 10, 1945 |
| 2,547,986 | Dermark | Apr. 10, 1951 |
| 2,648,126 | Flickinger | Aug. 11, 1953 |
| 2,697,870 | Zucker | Dec. 28, 1954 |
| 2,783,667 | Wilson | Mar. 5, 1957 |